Oct. 5, 1943.  R. A. SENKBEIL ET AL  2,331,143

CONVEYER

Filed Jan. 6, 1942  2 Sheets-Sheet 1

Inventors
Raymond A. Senkbeil,
Charles H. Kneckman, Sr.
By
Munn, Liddy, Glassum & Kane
Attorney

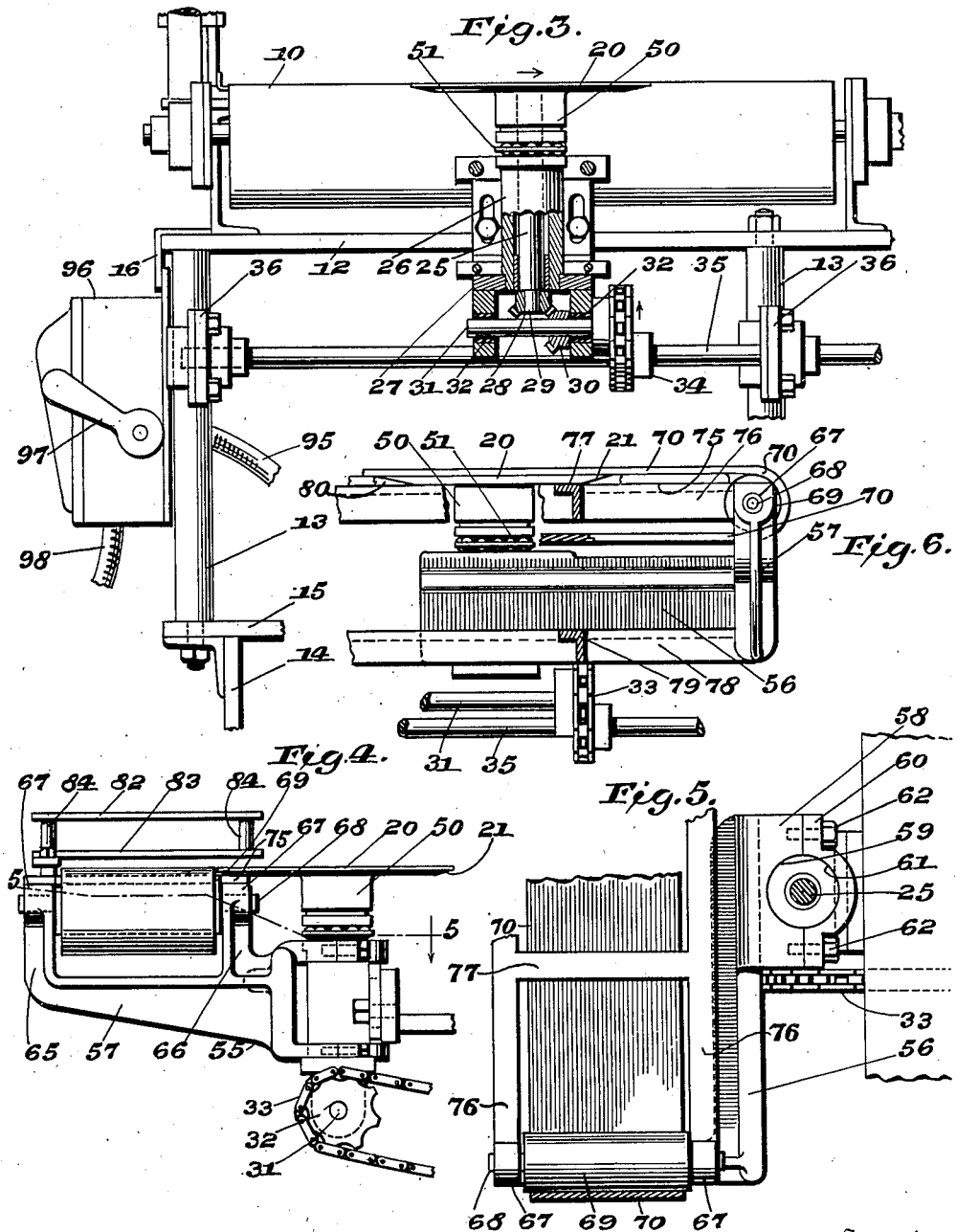

Patented Oct. 5, 1943

2,331,143

UNITED STATES PATENT OFFICE 2,331,143

CONVEYER

Raymond A. Senkbeil, Baltimore, and Charles H. Knickman, Sr., Catonsville, Md., assignors to Maryland Glass Corporation, Baltimore, Md., a corporation of Maryland Application January 6, 1942, Serial No. 425,786

5 Claims. (Cl. 198—25)

This invention relates to a conveyer for delivering articles to a stacker.

An object of the invention is the provision of a conveyer containing a belt and a framework for supporting the belt with one end of the framework and belt being swingably mounted on a shaft which drives a turn-table located between the swingably mounted end of the framework and the leer conveyer so that the first mentioned conveyer may be moved from a position parallel to the adjacent end of the leer conveyer to various angular positions, the adjacent ends of the conveyers and the turn-table being located in the same horizontal plane.

A further object of the invention is the provision of a feeding conveyer for delivering articles to a turn-table which in turn directs the articles onto a leer conveyer in substantially the same horizontal plane, the first mentioned conveyer being adapted to be moved to various angular positions with respect to the end of the leer conveyer so that the opposite end of the feeding conveyer may be moved to various points for supplying the conveyer with articles which are to be directed to the leer conveyer, means being employed for guiding the articles which are conveyed by the feeding conveyer onto the turntable, said last mentioned means being adjustable to take care of articles of various sizes.

A further object of the invention is the provision of a feeding conveyer for carrying articles to a leer conveyer with a turn-table located between the adjacent ends of the feeding conveyer and the leer conveyer for transporting articles between the two conveyers, the turn-table being driven by a shaft which provides a swingable mounting for a framework that supports the feeding conveyer so that the feeding conveyer may be swung to various angles with respect to the adjacent end of the leer conveyer.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 3 is a fragmentary view in elevation and partly in section showing the operating means for a turntable shaft and the swingable mounting of a feeding conveyer.

Figure 4 is a fragmentary view in elevation showing the swingable mounting for a framework that supports the feeding conveyer.

Figure 5 is a horizontal section taken along the line 5—5 of Fig. 4.

Figure 6 is a fragmentary side elevation of the swingable mounting shown in Fig. 4.

Figure 1:
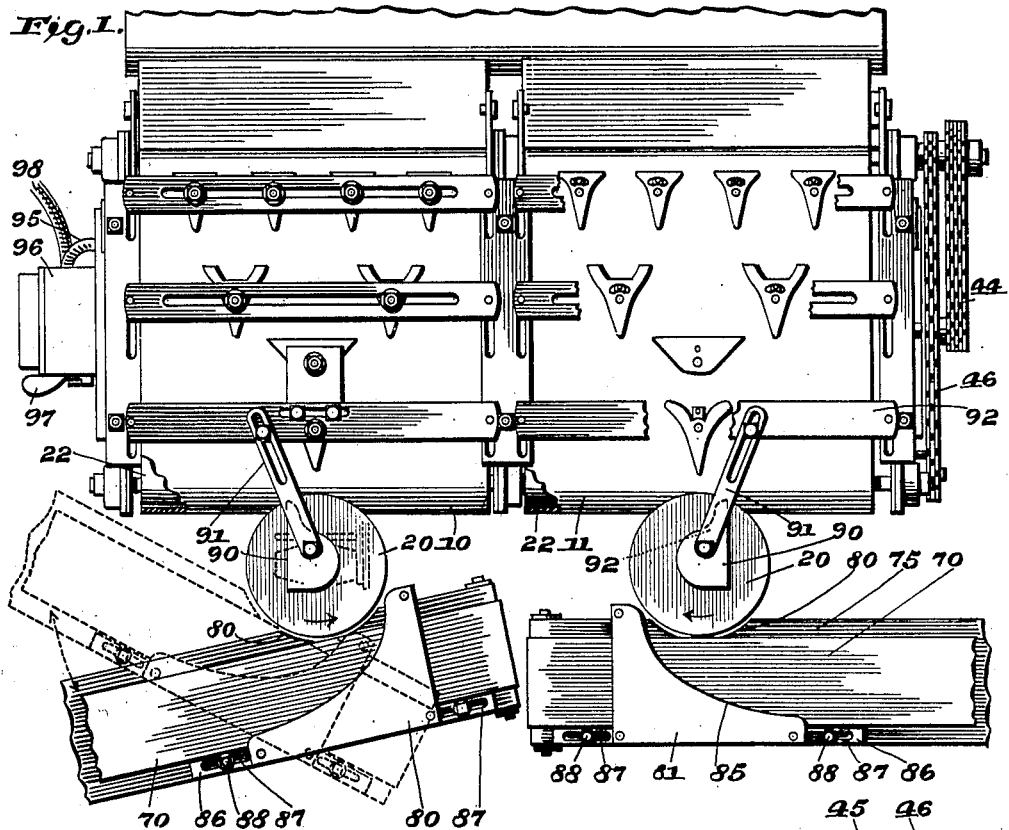
Figure 1 is a fragmentary plan view of a leer conveyer and stacker showing my invention applied thereto.
Figure 2:
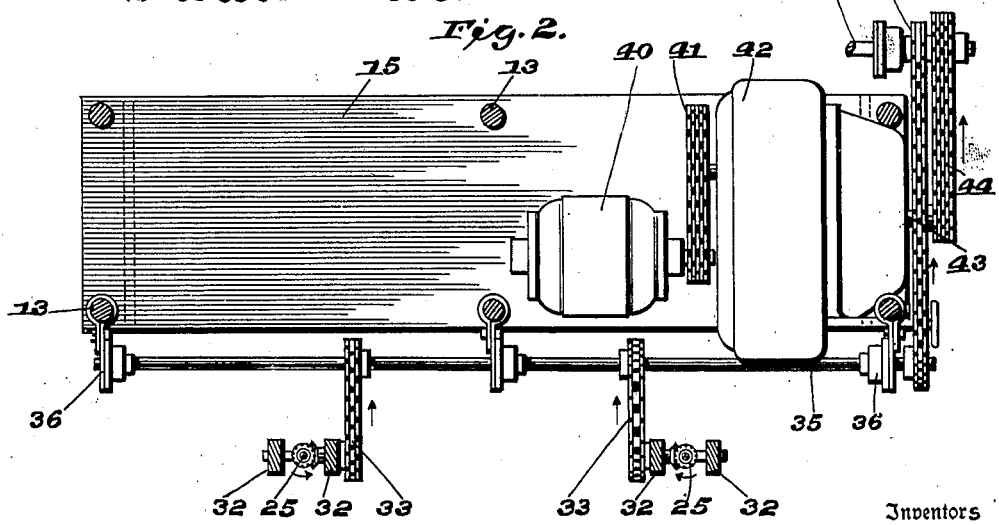
Figure 2 is a horizontal section below the conveyers and disclosing the operating mechanism for various elements of the leer conveyer and the associated parts.

Referring more particularly to Fig. 1 it will be seen that 10 and 11 designate a pair of leer conveyers supported by a framework partially shown in Fig. 3, and this framework consists of transverse bars 12, posts 13 and standards 14 which support the post 13 and a table 15. Longitudinal angle irons 16 are connected to the transverse bars 12. The belts 10 and 11 together with the various stacker elements shown in connection with the said conveyers are described and claimed in our copending application Serial No. 401,681, filed July 9, 1941 entitled Glassware distributor for leers. Therefore no further description will be given of the leer conveyers and their associated elements. It is only necessary however, for the purposes of this invention, to show the leer conveyers to which articles of glassware are fed and adapted to be stacked before being placed within the leer.

Adjacent the entrance end of each of the leer conveyers 10 and 11 is placed a turn-table 20 which has a flat top located in the same plane with the plane of the conveyers. It will be noted from Figs. 3, 4 and 6 that the lower peripheral edges of each turn-table has a beveled portion as shown at 21 so that this beveled edge may ride over the adjacent end of each of the leer conveyers 10 and 11 whereby the articles which are received by the turn-table may be guided onto the leer conveyers in substantially the same plane. In other words, the outer edges of the turn-tables 20 are sheared off sufficiently at the outer surface of the turn-table at the outer and under surface of each turn-table so that the upper surface of the turn-table will be in substantially horizontal alinement with its respective leer conveyer 10 or 11. Each of the conveyers are curved over the rollers 22 and the beveled edge 21 of each of the turn-tables conforms to such curvature in order that the revolving turn-tables will be in overlapping relation with the curved portions of the conveyers 10 and 11.

A shaft 25 has its upper end secured to the turn-table 20 (Fig. 3). This shaft is mounted in a bearing sleeve 26 supported by a thrust plate 27. A gear 28 is secured to the lower reduced end 29 of the shaft 25 and meshes with a gear 30 secured to a driven shaft 31 mounted in spaced bearings 32.

The shaft 31 is driven by a sprocket wheel 32 which in turn is driven by a chain 33 that in turn is driven by a sprocket 34 rotated by a shaft 35. The last mentioned shaft is mounted in bearings 36 carried by the post 13.

A motor 40 is mounted on the table 15 and drives the chain 41 for operating a speed reducer 42 also carried by the table 15. This speed reducer drives a shaft 43 which in turn through sprockets, not shown, and a chain 44 operates a shaft 45. This shaft through sprockets, not shown, and by means of a chain 46 trained on the sprockets drives the shaft 35.

Referring again to Fig. 3 it will be seen that the sleeve 50 which is connected to the turn-table 20 is spaced from the cylindrical bearing 26 by means of roller bearings 51.

A bracket generally designated by the numeral 55 has an arm 56 extending substantially parallel to an end of a leer conveyer and has another arm generally designated by the numeral 57 extending at right angles to the arm 56. The inner end of the arm 56 is provided with a bearing block 58 having a semi-circular bearing surface 59 adapted to engage around the sleeve 26.

A plate 60 has a semi-circular bearing surface 61 adapted to engage around the other half of the sleeve 26 with bolts 62 securing the member 60 to the member 58. Thus it will be seen that the arm 56 is swingably mounted on the shaft which revolves the turn-table 20.

The arm 57 as shown in Figs. 4 and 6, is provided with uprights 65 and 66 having bearings 67 at their upper free ends to receive the ends of an axle 68 which carries a roller 69. This roller is an idler upon which a feeding belt 70 is trained.

A table 75 is connected to a framework consisting of angle irons 76, 77, 78 and 79 and this framework is rigidly secured to the bracket arm 57 so that when the framework and likewise the table 75 is swung to various positions the feeding belt 70 will likewise be moved as shown in Fig. 1. In other words, the feeding conveyer 70 may be located in parallel relation with the ends of the leer conveyers 10 and 11 or they may be moved at an angular position within 180 degrees of the ends of the leer conveyer.

It will be noted from Figs. 1 and 6 that each of the tables 75 has a cut-out portion 80 so that a portion of the turn-table 20 may revolve therein and in close association with the feeding belt 70.

A guiding means generally designated by the numeral 81 is adjustably mounted on the table 75 adjacent its respective turn-table 20. As shown more particularly in Fig. 4 this guiding means consists of a pair of plates 82 and 83 located in parallel relation and maintained in such relation by means of spacers 84. These plates are substantially triangular in shape but their inner edges are curved as shown at 85 so that when articles are carried along by the belt 70 they will be moved into engagement with the curved surface and the camming action of these surfaces will gradually force the articles onto the turn-tables 20.

The member 81 is secured to a strip of metal 86 which is provided with a slot 87 at each end and upon opposite sides of the member 81. A bolt 88 passes through the slots and is threaded into an opening in the table 75 so that the member 81 may be adjusted toward or away from the turn-table 20 in order to take care of larger or smaller articles that are carried by the feeding conveyer 70.

A guide means 90 is located above the surface of each turn-table 20 and is supported by members 91 upon transverse bars 92 which extend across the leer conveyers 10 and 11. The members 90 are so positioned that when articles are received by the turn-table 20 which is revolving in the direction indicated by the arrow in Fig. 1, the articles will move around toward the curved portion 92 of each member 90 and thus be forced off of the turn-table onto its adjacently associated leer conveyer.

The motor 40 is connected with the wires in a sheath 95 which runs to a switch box 96 carried by the framework of the leer conveyer. This switch is operated by a handle 97. A sheath 98 carries wires therein to a point for connection with the socket of the usual house current.

It will be seen by this construction that the conveyers 70 may be moved to various angles with respect to the adjacent ends of the leer conveyers 10 and 11 because the inner end of each conveyer which includes the framework is swingably supported on the shaft 25 of a turn-table so that the opposite end of the feeding conveyer may be positioned conveniently at a point for receiving articles which are to be directed into the leer through the various elements described above.

We claim:

1. In a leer stacker including a conveyer to receive articles to be stacked, a conveyer belt for feeding articles to the leer conveyer, a turn-table between the adjacent ends of the conveyers and acting as a medium for transferring articles from the belt to the leer conveyer, a vertically disposed shaft for revolving the turn-table, a bracket swingably mounted on the shaft and located parallel to the belt, an arm projecting laterally from the free end of the bracket, a roller mounted on the arm and upon which the belt is trained, a table having one end connected to the arm, supporting the upper flight of said belt and swingable around the shaft, means for revolving the shaft, and means carried by the table and extending over the belt for causing articles which are conveyed along the belt to be discharged onto the turntable.

2. In a leer stacker including a conveyer to receive articles to be stacked, a conveyer belt for feeding articles to the leer conveyer, a turn-table between the adjacent ends of the conveyers and acting as a medium for transferring articles from the belt to the leer conveyer, a vertically disposed shaft for revolving the turn-table, a bracket swingably mounted on the shaft and located parallel to the belt, an arm projecting laterally from the free end of the bracket, a roller mounted on the arm and upon which the belt is trained, a table having one end connected to the arm, supporting the upper flight of said belt and swingable around the shaft, means for revolving the shaft, means carried by the table and extending over the belt for causing articles which are conveyed along the belt to be discharged onto the turntable, means for adjustably positioning the last mentioned means along the table for taking care of various sizes of articles.

3. In a leer stacker including a conveyer to receive articles to be stacked, a conveyer belt for feeding articles to the leer conveyer and adapted to be swung from a position parallel to an end of the leer conveyer to various angular positions, a turntable between the adjacent ends of the two conveyers, a shaft for revolving the turntable, a supporting table for the upper flight of the conveyer belt, means swingably mounting one end of the supporting table on the shaft including a bracket parallel to the conveyer belt and a right angularly disposed arm, a roller on the arm for supporting one end of the conveyer belt, said supporting table having a cut-out portion to receive a portion of the turntable, means for rotating the turntable, and means carried by the supporting table for causing articles carried by the conveyer belt to be directed onto the turntable.

4. In a leer stacker including a conveyer to receive articles to be stacked, a conveyer belt for feeding articles to the leer conveyer and adapted to be swung from a position parallel to an end of the leer conveyer to various angular positions, a turntable between the adjacent ends of the conveyers, a vertical shaft for revolving the turntable, a table for supporting the upper flight of the belt conveyer, an article guide means carried by the supporting table and extending over the upper flight of the belt conveyer, means swingably mounting one end of the belt supporting table on the shaft and comprising a bracket having one end pivoted on said shaft and parallel to the belt, an arm extending laterally from the free end of the bracket and connected to the last-mentioned end of the belt supporting table, said guide means having a fixed position with the belt conveyer.

5. In a leer stacker including a leer conveyer to receive articles to be stacked, means for actuating the conveyer, a conveyer belt for feeding articles to the leer conveyer and adapted to be swung from a position parallel to an end of the leer conveyer to various angular positions, a turntable between the adjacent ends of the conveyers, a shaft for revolving the turntable, a framework for supporting the upper flight of the belt conveyer and including a bracket parallel to the belt and an arm at right angles on one side of the bracket, a swingable mounting connecting the other end of the bracket to the shaft, a roller on the arm supporting one end of the belt conveyer the adjacent ends of the two conveyers and turntable being in substantially the same plane, means on the framework for guiding articles from the conveyer belt to the turntable and swingable with the framework and conveyer belt, and means operated by the actuating means for the leer conveyer for causing rotation of the shaft.

RAYMOND A. SENKBEIL.
CHARLES H. KNICKMAN, Sr.